United States Patent
Sei et al.

(10) Patent No.: US 10,714,796 B2
(45) Date of Patent: Jul. 14, 2020

(54) BATTERY TEMPERATURE SENSOR AND ATTACHMENT STRUCTURE THEREOF

(71) Applicant: Yazaki Corporation, Tokyo (JP)

(72) Inventors: Makoto Sei, Makinohara (JP); Akinori Sakamoto, Makinohara (JP)

(73) Assignee: YAZAKI CORPORATION, Minato-ku, Tokyo (JP)

(*) Notice: Subject to any disclaimer, the term of this patent is extended or adjusted under 35 U.S.C. 154(b) by 235 days.

(21) Appl. No.: 15/954,124

(22) Filed: Apr. 16, 2018

(65) Prior Publication Data
US 2018/0342775 A1    Nov. 29, 2018

(30) Foreign Application Priority Data
May 23, 2017    (JP) ................... 2017-101998

(51) Int. Cl.
*H01M 10/48* (2006.01)
*H01M 2/20* (2006.01)
(Continued)

(52) U.S. Cl.
CPC ............ *H01M 10/486* (2013.01); *G01K 1/14* (2013.01); *G01K 13/00* (2013.01); *H01M 2/202* (2013.01);
(Continued)

(58) Field of Classification Search
CPC .. H01M 10/486; H01M 10/482; H01M 2/202; G01K 1/14; G01K 13/00;
(Continued)

(56) References Cited

U.S. PATENT DOCUMENTS 5,462,359 A * 10/1995 Reichl ................. G01K 13/02
                                                    374/148
2002/0142627 A1* 10/2002 Kameyama .......... H01R 12/592
                                                    439/67
(Continued)

FOREIGN PATENT DOCUMENTS

CN    102483359 A    5/2012
CN    105571740 A    5/2016
(Continued)

OTHER PUBLICATIONS

Office Action dated Jun. 18, 2019 by the Japan Patent Office in counterpart Japanese Patent Application No. 2017-101998.

*Primary Examiner* — Lisa M Caputo
*Assistant Examiner* — Philip L Cotey
(74) *Attorney, Agent, or Firm* — Sughrue Mion, PLLC

(57) ABSTRACT

A battery temperature sensor includes a sensor body and an electric wire connecting connector. The sensor body includes a sensor housing configured to be detachably attached to a mating body, a first locking member provided on the sensor housing and configured to be locked to the mating body, and a temperature measuring element integrally formed in the sensor housing. The electric wire connecting connector includes a connector housing configured to be detachably attached to the sensor housing, a second locking member provided on the connector housing and configured to be locked to the sensor housing, and a pair of terminals attached to the connector housing. The terminals are electrically connected to the pair of leads respectively when the connector housing is coupled to the sensor housing.

8 Claims, 4 Drawing Sheets

(51) Int. Cl.
  *H01R 4/18* (2006.01)
  *G01K 1/14* (2006.01)
  *G01K 13/00* (2006.01)
  *H01R 24/20* (2011.01)
  *H01R 13/627* (2006.01)

(52) U.S. Cl.
  CPC .......... *H01M 10/482* (2013.01); *H01R 4/183* (2013.01); *H01R 24/20* (2013.01); *H01R 13/6272* (2013.01); *H01R 13/6273* (2013.01)

(58) Field of Classification Search
  CPC .... H01R 4/183; H01R 24/20; H01R 13/6272; H01R 13/6273
  See application file for complete search history.

(56) References Cited

U.S. PATENT DOCUMENTS

| | | | | |
|---|---|---|---|---|
| 2004/0165648 | A1* | 8/2004 | Ikeda | G01K 1/14 374/208 |
| 2009/0155680 | A1* | 6/2009 | Maguire | H01M 10/625 429/158 |
| 2010/0285340 | A1* | 11/2010 | Matsunaga | G01D 11/245 429/90 |
| 2012/0031517 | A1* | 2/2012 | Yoshida | G01K 1/14 138/103 |
| 2016/0028194 | A1* | 1/2016 | Nakayama | H01M 2/206 439/620.21 |
| 2016/0072224 | A1* | 3/2016 | Ichio | H01R 13/4367 439/345 |
| 2016/0126601 | A1* | 5/2016 | Ichikawa | H02J 7/0047 374/152 |
| 2017/0328783 | A1* | 11/2017 | Okamoto | G01K 1/14 |

FOREIGN PATENT DOCUMENTS

| | | |
|---|---|---|
| JP | 07-509067 A | 10/1995 |
| JP | 2002-267626 A | 9/2002 |
| JP | 2002-291135 A | 10/2002 |
| JP | 2011-17638 A | 1/2011 |
| JP | 2012-225844 A | 11/2012 |
| JP | 2016-122577 A | 7/2016 |
| WO | 2017/052080 A1 | 3/2017 |

* cited by examiner

BATTERY TEMPERATURE SENSOR AND ATTACHMENT STRUCTURE THEREOF

CROSS REFERENCE TO RELATED APPLICATIONS

This application is based on Japanese Patent Application (No. 2017-101998) filed on May 23, 2017, the contents of which are incorporated herein by reference.

BACKGROUND OF THE INVENTION

1. Field of the Invention

The present invention relates to a battery temperature sensor and an attachment structure thereof.

2. Description of the Related Art

A battery temperature sensor is fitted in an arranging case (also referred to as a "busbar module") of an electric wire for the purpose of detecting a temperature of a battery and is installed on an upper surface of the battery (for example, see JP-A-2011-17638). In the related art, first, a pair of element leads protruding from the formed temperature measuring portion is crimped to respective conductors of a pair of electric wires with terminals, the crimping portion is soldered, and the soldered connection portion is further covered with an insulating tube, whereby a battery temperature sensor is connected to the electric wire.

However, the electric wire connected to the battery temperature sensor of the related art is bundled for each of a plurality of battery temperature sensors and is fixed to an arranging path of the busbar module. The busbar module is fixed to the battery stack integrally formed by assembling a plurality of fuel cells (unit cells). In the configuration of the busbar module attached with the battery temperature sensor, when the battery temperature sensor needs to be replaced, it is considered that the fixing of the busbar module to the battery stack is released and the battery temperature sensor is replaced for each busbar module. However, re-fixing of the busbar module to the battery stack is not recommended. For this reason, when one battery temperature sensor needs to be replaced, the replacement has to performed for each battery stack.

SUMMARY OF THE INVENTION

The invention has been made in view of the above circumstances, and an object thereof is to provide a battery temperature sensor and an attachment structure of the battery temperature sensor in which the replacement of the battery stack can be made unnecessary even when the battery temperature sensor needs to be replaced.

The above object according to the invention is achieved by the following configurations.

(1) There is provided a battery temperature sensor including:
  a sensor body including:
  a sensor housing configured to be detachably attached to a mating body;
  a first locking member provided on the sensor housing and configured to be locked to the mating body; and
  a temperature measuring element integrally formed in the sensor housing so as to expose a temperature measuring portion of the temperature measuring element; and
  an electric wire connecting connector including:
  a connector housing configured to be detachably attached to the sensor housing;
  a second locking member provided on the connector housing and configured to be locked to the sensor housing; and
  a pair of terminals attached to the connector housing,
  wherein a pair of parallel leads of the temperature measuring element are protruded from the sensor housing; and
  wherein based ends of the terminals are configured to be connected to conductors of electric wires, and tip ends of the terminals are electrically connected to the pair of leads respectively when the connector housing is coupled to the sensor housing.

For example, the based ends of the terminals are configured to be crimped to the conductors of electric wires respectively.

For example, the connector housing is fitted into the sensor housing.

For example, when the connector housing is fitted into the sensor housing, the second locking member is locked to an inner face of the sensor housing.

According to the battery temperature sensor of the above configurations, when it is necessary to replace the temperature measuring element, the connector housing of the electric wire connecting connector is released from the sensor housing of the sensor body formed integrally with the temperature measuring element. That is, the sensor body which needs to be replaced is separated from the electric wire via the electric wire connecting connector, thereby becoming a single body, and the electric wire arranging portion can be detached from the mating body. When the connector housing is coupled to the sensor housing, a new sensor body for replacement is connected to the electric wire connecting connector. In the new sensor body connected to the existing electric wire via the electric wire connecting connector, the first locking member is locked to a locking portion of the mating body and is attached to the mating body. In the battery temperature sensor according to the above configuration, as described above, since the connector housing and the sensor housing have the connector connecting structure, the sensor housing can be easily replaced with respect to the electric wire and the mating body. Therefore, according to the battery temperature sensor of the above configuration, the replacement can be performed in a state where the electric wire is fixed to the busbar module.

There is provided an attachment structure of the battery temperature sensor, including:
  a busbar module configured to be fixed to a battery stack formed by stacking a plurality of unit cells, and the busbar module having a sensor attachment hole through which the temperature measuring portion passes and comes in contact with the battery stack,
  wherein the electric wire is fixed to an electric wire arranging portion provided on the busbar module; and
  wherein the connector housing connected to the electric wire is coupled to the sensor housing locked to the sensor attachment hole, and the pair of leads are electrically connected to the pair of terminals respectively.

According to the attachment structure of the battery temperature sensor of the above configuration, when the battery temperature sensor needs to be replaced, the connector housing of the electric wire connecting connector can be released from the sensor housing of the sensor body. The sensor body, which needs to be replaced, is released from the connection with the electric wire connecting connector, thereby releasing the locking of the sensor-side locking member with respect to the sensor attachment hole of the of the busbar module, and can be detached individually from the sensor attachment hole. A new sensor body for replacement is connected to the electric wire connecting connector when the connector housing is coupled to the sensor housing. In the attachment structure of the battery temperature sensor according to the above configuration, as described above, since the connector housing and the sensor housing have the connector connecting structure, the sensor housing can be easily replaced with respect to the electric wire and the busbar module. Then, the electric wire can be fixed to the electric wire arranging portion of the busbar module. Further, the busbar module can also be fixed to the battery stack.

According to the battery temperature sensor of the invention, when the replacement is needed, the connector housing of the electric wire connecting connector is released from the connection with the sensor housing of the sensor body, and a new sensor body can be re-coupled to the electric wire connecting connector. As a result, even when the battery temperature sensor needs to be replaced, replacement of the battery stack can be made unnecessary.

According to the attachment structure of the battery temperature sensor of the invention, since the sensor body can be separated and reconnected from/to the electric wire fixed to the busbar module, even when the battery temperature sensor needs to be replaced, the replacement of the battery stack can be made unnecessary.

The invention has been described briefly. Further, the details of the invention will be made clearer through the following mode for carrying out the invention (hereinafter referred to as "embodiment") with reference to the accompanying drawings.

DETAILED DESCRIPTION OF THE EXEMPLARY EMBODIMENTS

An embodiment of the invention will be described below with reference to the drawings.

Figure 1:
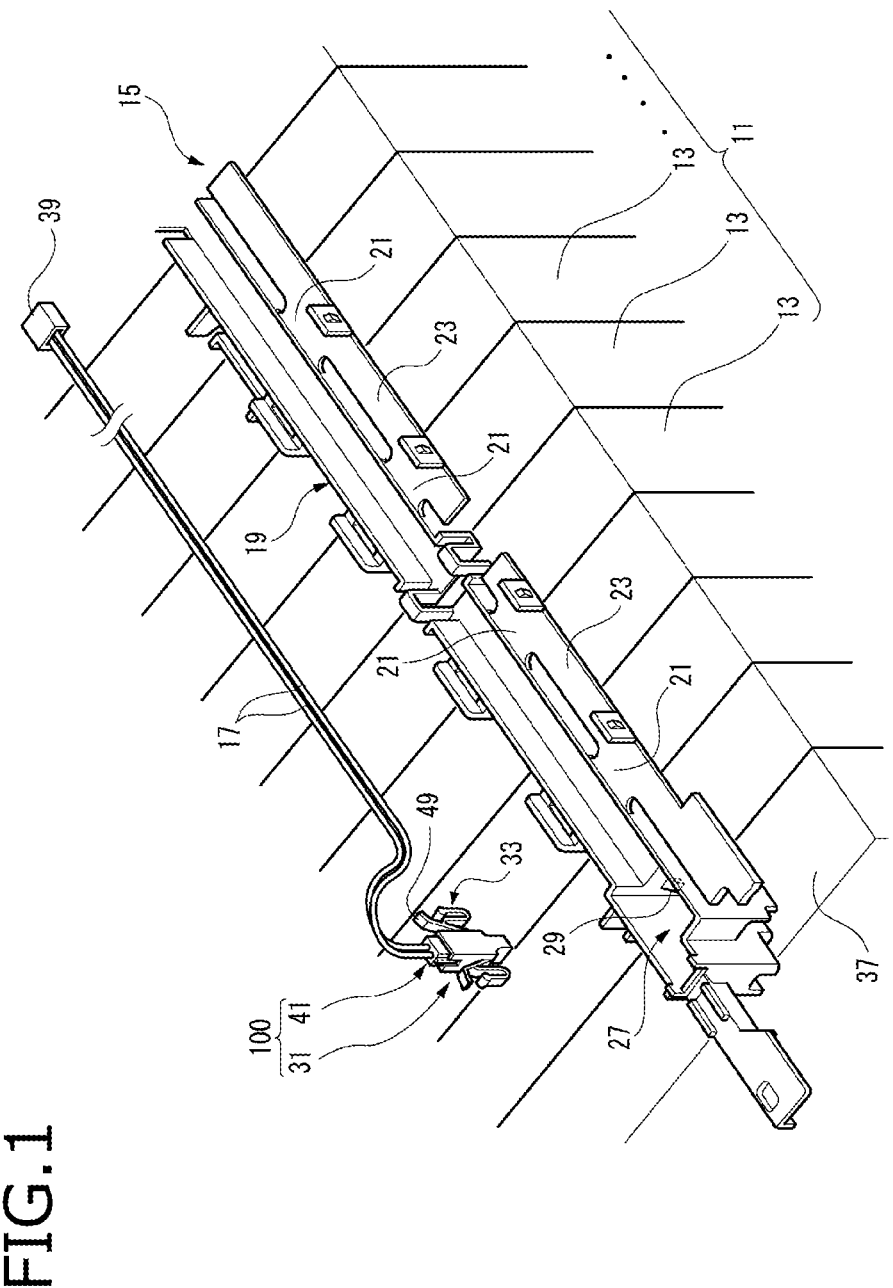
FIG. 1 is a perspective view of a main portion of a battery stack illustrating an attachment structure of a battery temperature sensor according to an embodiment of the invention.

FIG. 1 is a perspective view of a main portion of a battery stack 11 illustrating an attachment structure of a battery temperature sensor according to the embodiment of the invention.

As illustrated in FIG. 1, in the attachment structure of the battery temperature sensor according to the embodiment, a battery temperature sensor 100 is attached to a battery stack 11. The battery stack 11 is formed by stacking a plurality of unit cells 13 in series and increasing a voltage. In order to prevent over-charge and over-discharge of the battery stack 11, the battery temperature sensor 100 is attached to the battery stack 11 and monitors a temperature.

A busbar module 15, which is a mating body, is fixed to the battery stack 11. The busbar module 15 is fixed to the battery stack 11 in such a manner that fixing and releasing are regulated in order to secure reliability of electric connection.

The busbar module 15 is formed by fixing a plurality of conductive metal plates (busbars; not illustrated) to an insulating resin case. The busbar module 15 is formed with a busbar accommodating portion (not illustrated) for accommodating the plurality of busbars and an electric wire arranging portion 19 for arranging a detection wire for a voltage detecting sensor or an electric wire 17 for a temperature sensor. The electric wire arranging portion 19 is closed by a lid 23 formed integrally with the busbar module 15 with a hinge 21. These electric wires 17 are accommodated and fixed in the electric wire arranging portion 19.

A sensor attachment hole 27 is formed in the electric wire arranging portion 19 of the busbar module 15. A pair of locking portions 29 are formed in the sensor attachment hole 27 (see FIG. 3). The locking portion 29 is locked to a sensor-side locking arm 33 which is a sensor-side locking member of the sensor body 31 in the battery temperature sensor 100. At a position where the busbar module 15 is attached to the battery stack 11 (a position in FIG. 1), the sensor attachment hole 27 holds the battery temperature sensor 100 at a position where a temperature measuring portion 35 of the battery temperature sensor 100 comes in contact with a temperature measurement target surface 37 of the unit cell 13. The battery temperature sensor 100 detects a temperature of the unit cell 13 by coming in contact with the temperature measurement target surface 37. The battery temperature sensor 100 is connected to the electric wire 17, and is connected to an ECU (electronic control unit) via a temperature detecting connector 39 connected to an end of the electric wire 17.

The sensor attachment hole 27 can be provided corresponding to arbitrary unit cells 13 in the battery stack 11. That is, the sensor attachment hole 27 may be provided at one location or a plurality of locations corresponding to arbitrary unit cells 13.

Figure 2:
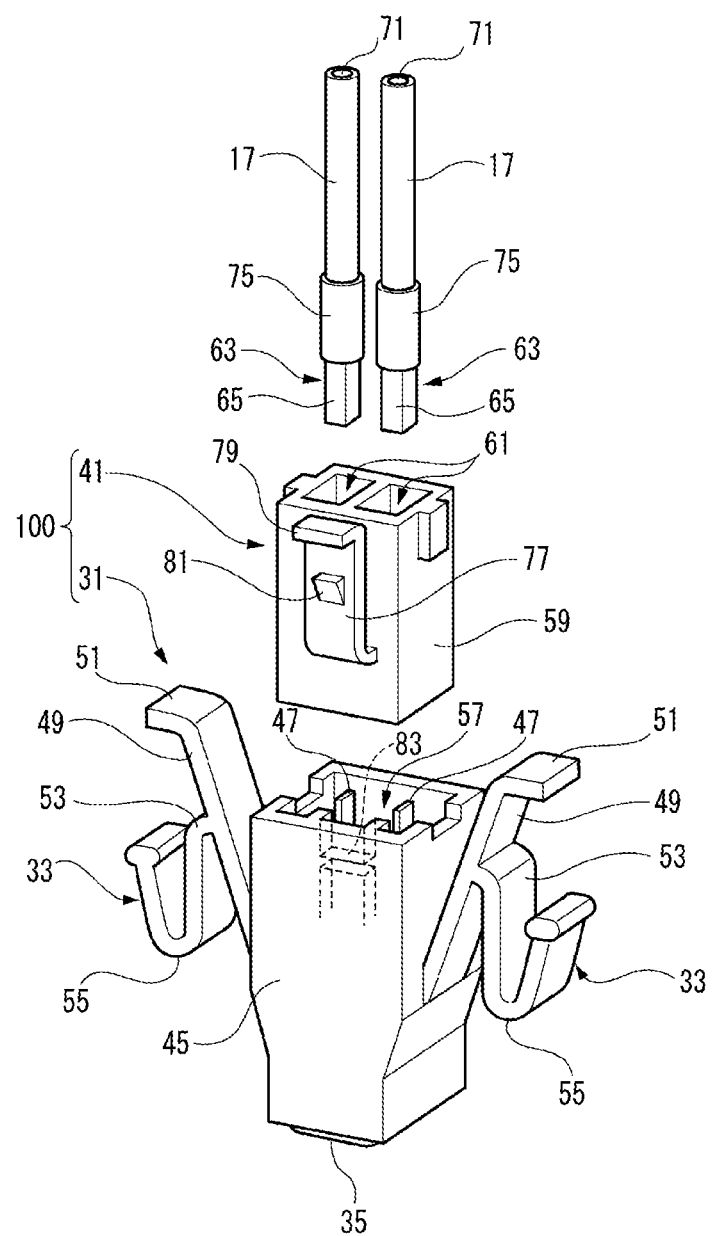
FIG. 2 is an exploded perspective view of the battery temperature sensor illustrated in FIG. 1.
Figure 3:
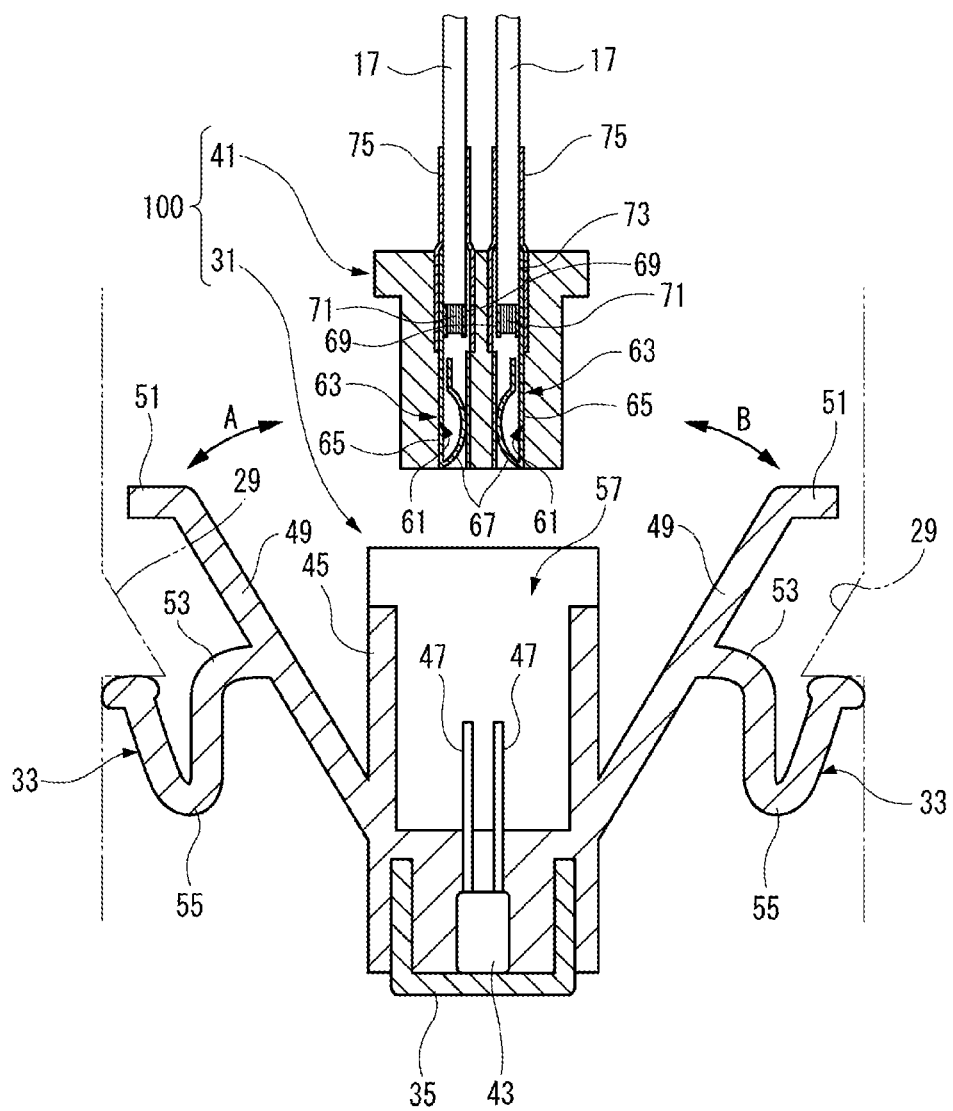
FIG. 3 is an exploded sectional view of a sensor body and an electric wire connecting connector.

FIG. 2 is an exploded perspective view of the battery temperature sensor 100 illustrated in FIG. 1, and FIG. 3 is an exploded sectional view of the sensor body 31 and the electric wire connecting connector 41.

As illustrated in FIGS. 2 and 3, the battery temperature sensor 100 includes the sensor body 31 and the electric wire connecting connector 41.

The sensor body 31 includes a sensor housing 45 in which a resin case covers a periphery of a thermistor 43 (see FIG. 3) serving as a temperature measuring element. The sensor housing 45 is formed with sensor-side locking arm 33 extending sideways from the sensor housing 45.

The sensor housing 45 includes the temperature measuring portion 35. A tip end of the temperature measuring portion 35 has a flat surface coming in contact with the temperature measurement target surface 37 of the unit cell 13. In addition, a lead 47 connected to the thermistor 43 provided in the sensor housing is drawn out from a rear end of the sensor housing 45, and the lead 47 is connected to a temperature measuring device or a temperature measuring circuit board of the ECU via the electric wire connecting connector 41 and the electric wire 17.

The sensor-side locking arms 33 are provided extending on both sides of the sensor housing 45. A free end being a tip end of the sensor-side locking arm 33 is locked to the locking portion 29 provided at a fixed position with respect to the surface of the unit cell 13, and thus the sensor-side locking arm 33 is positioned and fixed to the unit cell 13.

In the embodiment, the locking portion 29 protrudes to press the free end of the sensor-side locking arm 33 toward the unit cell, and is formed integrally with the busbar module 15 fixed to the surface side of the unit cell 13.

The sensor body 31 is attached to the busbar module 15 in such a manner that the free end of the sensor-side locking arm 33 is subjected to a pressing load toward the surface of the unit cell 13 by the locking portion 29. The close contact state between the temperature measuring portion 35 and the temperature measurement target surface 37 of the unit cell 13 is secured by an elastic restoring force of the sensor-side locking arm 33 in the sensor body 31.

The sensor-side locking arm 33 is provided on a flexible member 49 extending in an elastically displaceable manner in the sensor housing 45.

The flexible members 49 are arms that extend rearward from the outer periphery of the sensor housing 45, and are provided on both sides of the sensor housing 45. In addition, upon receiving an external force, the flexible member 49 is elastically displaceable in directions of arrows A and B in FIG. 3. The free end side of the flexible member 49 serves as a grip portion 51 to be gripped when the sensor body 31 is attached to the sensor attachment hole 27 of the busbar module 15.

In the embodiment, the sensor-side locking arms 33 on both sides extend from the middle of the flexible member 49.

Each of the sensor-side locking arms 33 is provided with a first bent portion 53 serving as a branch portion from the flexible member 49 and a second bent portion 55 adjacent to the first bent portion 53, the first bent portion and the second bent portion being bent portions that is flexibly deformed according to a load acting on the free end.

The first bent portion 53 has a smoothly curved shape that protrudes upward, and the second bent portion 55 has a smoothly curved shape that protrudes downward. At an intermediate position between the first bent portion 53 and the second bent portion 55, an inflection point to be shifted from the first bent portion 53 to the second bent portion 55 is set. That is, the first bent portion 53 and the second bent portion 55 form a bent shape having a smooth waveform similar to a sin curve. In addition, the first bent portion 53 has a smoothly curved shape in which the flexible member 49 is a circumscribing tangent line.

In the sensor body 31, a stress is generated in the sensor-side locking arm 33 due to the pressing load applied to the free end of the sensor-side locking arm 33. The stress is transmitted to a base end side of the sensor-side locking arm 33 because the base end of the sensor-side locking arm 33 is in the flexible member 49 extending so as to be elastically displaceable in the sensor housing 45 to cause elastic displacement of the flexible member 49, and is dispersed toward the flexible member 49.

Therefore, the sensor body 31 can prevent stress concentration from occurring at the base end of the sensor-side locking arm 33 to which the pressing load is applied, and can improve load-bearing performance of the sensor-side locking arm 33.

The sensor housing 45 is formed with a connector fitting portion 57 which is a square hole through which the lead 47 is led out. A protruding tip end of the lead 47 is disposed on a back side of the connector fitting portion 57. That is, the lead 47 can be used as a male terminal. A connector housing 59 of the electric wire connecting connector 41 is fitted to the connector fitting portion 57.

A pair of terminal accommodating chambers 61 are formed in the connector housing 59 made of an insulating resin. A terminal 63 is attached to each of the terminal accommodating chambers 61. For example, the terminal 63 is retained and fixed by a flexible locking claw (not illustrated) formed integrally with the connector housing 59 protruding inward of the terminal accommodating chamber 61.

The terminal 63 includes a box-like electric contact portion 65 on a front end side in a coupling direction. The lead 47 is inserted into the electric contact portion 65. That is, the terminal 63 is a female terminal. An elastic contact piece 67 is formed inside the electric contact portion 65. The elastic contact piece 67 makes elastic contact with the lead 47 inserted into the electric contact portion 65, and electrically connects the terminal 63 to the lead 47. A conductor crimping portion 69 is formed at a rear side of the electric contact portion 65. The conductor crimping portion 69 includes a pair of caulking pieces, and the pair of caulking pieces is caulked to a conductor 71 of the electric wire 17.

An electric wire crimping portion 73 is formed at a rear side of the conductor crimping portion 69. The electric wire crimping portion 73 includes a pair of electric wire caulking pieces. The electric wire crimping portion 73 caulks the pair of electric wire caulking piece from an outer side of the covering of the electric wire 17, thereby connecting the terminal 63 to the electric wire 17 with high strength. An insulating tube 75 is further covered on the conductor crimping portion 69, the electric wire crimping portion 73, and a part of the end of the electric wire 17.

As illustrated in FIG. 2, a connector-side locking arm 77, which is a connector-side locking member, is formed on the connector housing 59 of the electric wire connecting connector 41. A base end of the connector-side locking arm 77 is connected to the connector housing 59 and a tip end thereof protrudes toward the side opposite to the insertion direction. A knob portion 79 is formed at the protruding tip end of the connector-side locking arm 77. The connector-side locking arm 77 is elastically deformed by being gripped in a direction in which the knob portion 79 approaches the connector housing 59. A lock claw 81 protruding outward on the opposite side of the connector housing 59 is projected substantially in the middle of the connector-side locking arm 77 in the extending direction. The lock claw 81 is locked to a locked portion 83 formed on an inner surface of the connector fitting portion 57 in the sensor housing 45.

When the connector housing 59 is inserted into the connector fitting portion 57 of the sensor housing 45, the electric wire connecting connector 41 is elastically deformed in a direction in which the connector-side locking arm 77 approaches the connector housing 59 by a reaction force from the connector fitting portion 57. When the connector housing 59 is inserted into the connector fitting portion 57 up to a prescribed position, the lead 47 of the thermistor 43 is inserted into the electric contact portion 65 of the terminal 63. The lead 47 inserted into the electric contact portion 65 is sandwiched by the elastic contact piece 67 and is electrically connected thereto. At the same time, the lock claw 81 of the connector-side locking arm 77 is locked to the locked portion 83 of the sensor housing 45. As a result, the separation of the electric wire connecting connector 41 from the sensor body 31 is regulated. That is, the sensor body 31 and the electric wire connecting connector 41 are locked to each other in a coupled state. The battery temperature sensor 100 is in a state in which the lead 47 is electrically connected to the electric wire 17 in this coupled state.

Next, the operation of the above configuration will be described.

Figure 4:
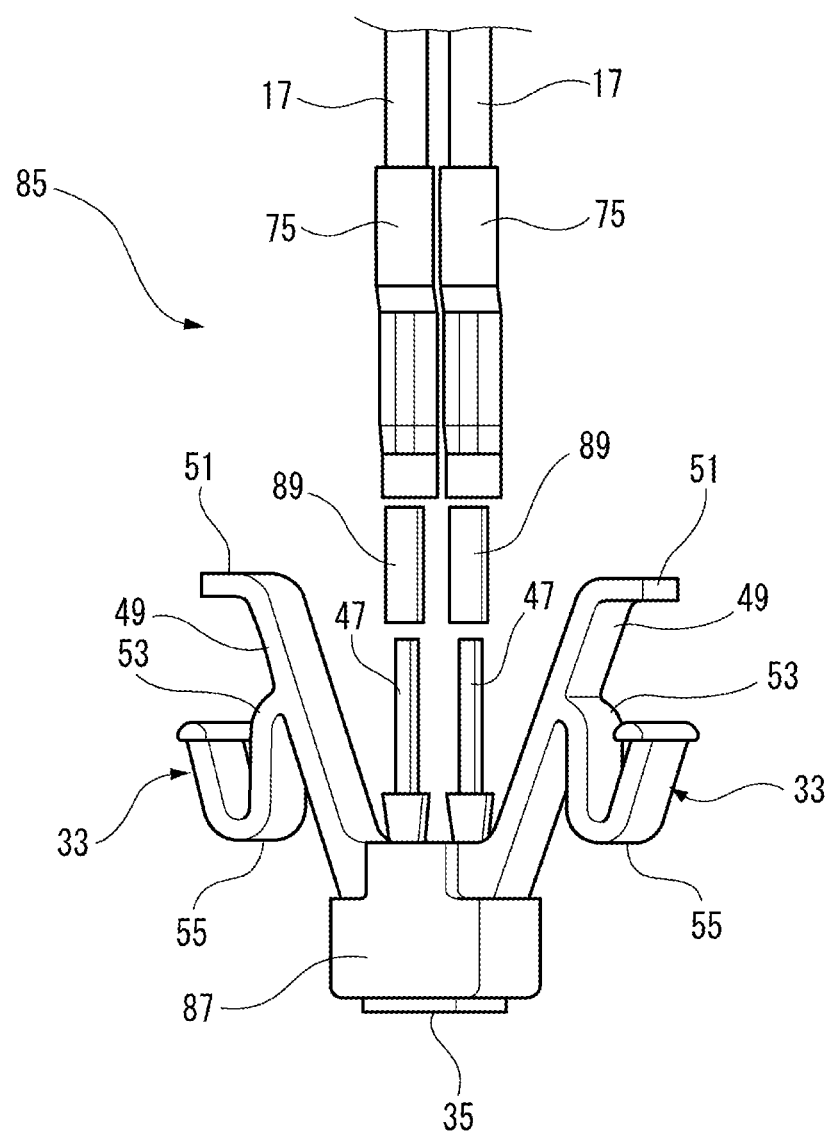
FIG. 4 is an exploded perspective view of a battery temperature sensor in which an electric wire is directly attached to a sensor body.

In order to remarkably differentiate the structure of the above embodiment from a structure of a battery temperature sensor according to the related art, a battery temperature sensor 85 is illustrated in FIG. 4 as a comparative example.

The battery temperature sensor 85 according to the comparative example is directly attached to the electric wire 17. In the battery temperature sensor 85, first, a pair of element leads protruding from a sensor housing 87 molded with a temperature measuring element and respective conductors 71 of a pair of electric wires 17 are crimped by a crimping terminal 89. Next, a connection portion, to which the crimping portion is soldered, is covered with an insulating tube 75 to connect to the electric wire 17.

On the other hand, the battery temperature sensor 100 according to the embodiment can be separated into two parts of the sensor body 31 and the electric wire connecting connector 41.

In the battery temperature sensor 100 according to the embodiment, when it is necessary to replace the temperature measuring element, the connector housing 59 of the electric wire connecting connector 41 is released from the sensor housing 45 of the sensor body 31 formed integrally with the temperature measuring element. That is, the sensor body 31 which needs to be replaced is separated from the electric wire 17 via the electric wire connecting connector 41, thereby becoming a single body, and the electric wire arranging portion 19 can be detached from the sensor attachment hole 27 in the busbar module 15.

When the connector housing 59 is coupled to the sensor housing 45, a new sensor body 31 for replacement is connected to the electric wire connecting connector 41. In the new sensor body 31 connected to the existing electric wire 17 via the electric wire connecting connector 41, the sensor-side locking arm 33 is locked to the locking portion 29 and is attached to the sensor attachment hole 27.

In the battery temperature sensor 100 according to the embodiment, as described above, since the electric wire connecting connector 41 and the sensor body 31 have the connector connecting structure, the sensor body 31 can be easily replaced with respect to the electric wire 17 and the busbar module 15.

Therefore, according to the battery temperature sensor 100 of the embodiment, the replacement can be performed in a state where the electric wire 17 is fixed to the busbar module 15.

In the attachment structure of the battery temperature sensor according to the embodiment, when the battery temperature sensor 100 needs to be replaced, the connector housing 59 of the electric wire connecting connector 41 can be released from the sensor housing 45 of the sensor body 31. The sensor body 31, which needs to be replaced, is released from the connection with the electric wire connecting connector 41, thereby releasing the locking of the sensor-side locking arm 33 with respect to the sensor attachment hole 27 of the of the busbar module 15, and can be detached individually from the sensor attachment hole 27.

A new sensor body 31 for replacement is connected to the electric wire connecting connector 41 when the connector housing 59 is coupled to the sensor housing 45. In the attachment structure of the battery temperature sensor according to the embodiment, as described above, since the electric wire connecting connector 41 and the sensor body 31 have the connector connecting structure, the sensor body 31 can be easily replaced with respect to the electric wire 17 and the busbar module 15. Then, the electric wire 17 can be fixed to the electric wire arranging portion 19 of the busbar module 15. Further, the busbar module 15 can also be fixed to the battery stack 11.

Therefore, according to the battery temperature sensor 100 of the embodiment, when the replacement is needed, the connector housing 59 of the electric wire connecting connector 41 is released from the connection with the sensor housing 45 of the sensor body 31, and a new sensor body 31 can be re-coupled to the electric wire connecting connector 41. As a result, even when the battery temperature sensor 100 needs to be replaced, replacement of the battery stack 11 can be made unnecessary.

According to the attachment structure of the battery temperature sensor of the embodiment, since the sensor body 31 can be separated and reconnected from/to the electric wire 17 fixed to the busbar module 15, even when the battery temperature sensor 100 needs to be replaced, the replacement of the battery stack 11 can be made unnecessary.

Further, there are two parts of the solder and the insulating tube 75 in the structure according to the related art, whereas there is one part of the electric wire connecting connector 41 in the attachment structure of the battery temperature sensor of the embodiment. For this reason, the number of parts can be reduced by one, and the connecting operation can also be simplified.

The invention is not limited to the above-described embodiment, and the respective configurations of the embodiment can be combined with each other and can be changed and modified by one skilled in the art, based on the descriptions of the specification and the well-known technologies, which are also expected by the invention and included in the scope of the invention to be protected.

In the above-described configuration example, for example, the temperature measurement target of the battery temperature sensor is the battery stack formed by integrating a plurality of unit cells, but the battery temperature sensor according to the invention may use various batteries as a temperature measurement target.

Here, the features of the battery temperature sensor and the attachment structure thereof according to the invention described above will be briefly summarized and listed below [1] to [5].

[1] A battery temperature sensor (100) including:
a sensor body (31) including:
a sensor housing (45) configured to be detachably attached to a mating body;
a first locking member (sensor-side locking arm 33) provided on the sensor housing (45) and configured to be locked to the mating body (busbar module 15); and
a temperature measuring element (thermistor 43) integrally formed in the sensor housing so as to expose a temperature measuring portion (35) of the temperature measuring element; and
an electric wire connecting connector (41) including:
a connector housing (59) configured to be detachably attached to the sensor housing (45);
a second locking member (connector-side locking arm 77) provided on the connector housing (59) and configured to be locked to the sensor housing (45); and
a pair of terminals (63) attached to the connector housing (59),
wherein a pair of parallel leads (47) of the temperature measuring element (43) are protruded from the sensor housing (45); and
wherein based ends of the terminals (63) are configured to be connected to conductors (17) of electric wires (71), and tip ends of the terminals (63) are electrically connected to the pair of leads (47) respectively when the connector housing (59) is coupled to the sensor housing (45).

[2] The battery temperature sensor (100) according to the above [1], wherein the based ends of the terminals (63) are configured to be crimped to the conductors (17) of electric wires (71) respectively.

[3] The battery temperature sensor (100) according to the item [1], wherein the connector housing (59) is fitted into the sensor housing (45).

[4] The battery temperature sensor (100) according to the above [3], wherein when the connector housing (59) is fitted into the sensor housing (45), the second locking member (77) is locked to an inner face of the sensor housing (45).

[5] An attachment structure of the battery temperature sensor (100) according to the above [1], including:
a busbar module (15) configured to be fixed to a battery stack (11) formed by stacking a plurality of unit cells (13), and the busbar module (15) having a sensor attachment hole (27) through which the temperature measuring portion (35) passes and comes in contact with the battery stack (11),
wherein the electric wire (17) is fixed to an electric wire arranging portion (19) provided on the busbar module (15); and
wherein the connector housing (59) connected to the electric wire (17) is coupled to the sensor housing (45) locked to the sensor attachment hole (27), and the pair of leads (47) are electrically connected to the pair of terminals (63) respectively.

What is claimed is:

1. A battery temperature sensor comprising:
   a sensor body including:
      a sensor housing configured to be detachably attached to a mating body;
      a first locking member provided on the sensor housing and configured to be locked to the mating body; and
      a temperature measuring element integrally formed in the sensor housing so as to expose a temperature measuring portion of the temperature measuring element; and
   an electric wire connecting connector including:
      a connector housing configured to be detachably attached to the sensor housing;
      a second locking member provided on the connector housing and configured to lock the sensor housing; and
      a pair of terminals attached to the connector housing,
   wherein a pair of parallel leads of the temperature measuring element are protruded from the sensor housing; and
   wherein based ends of the terminals are configured to be connected to conductors of electric wires, and tip ends of the terminals are electrically connected to the pair of leads respectively when the connector housing is coupled to the sensor housing.

2. The battery temperature sensor according to claim 1, wherein the based ends of the terminals are configured to be crimped to the conductors of electric wires respectively.

3. The battery temperature sensor according to claim 1, wherein the connector housing is fitted into the sensor housing.

4. The battery temperature sensor according to claim 3, wherein when the connector housing is fitted into the sensor housing, the second locking member is locked to an inner face of the sensor housing.

5. The battery temperature sensor according to claim 3, wherein an entirety of an end of the connector housing is fitted into the sensor housing.

6. An attachment structure of the battery temperature sensor according to claim 1, comprising:
   a busbar module configured to be fixed to a battery stack formed by stacking a plurality of unit cells, and the busbar module having a sensor attachment hole through which the temperature measuring portion passes and comes in contact with the battery stack,
   wherein the electric wire is fixed to an electric wire arranging portion provided on the busbar module; and
   wherein the connector housing connected to the electric wire is coupled to the sensor housing locked to the sensor attachment hole, and the pair of leads are electrically connected to the pair of terminals respectively.

7. The battery temperature sensor according to claim 1, wherein the pair of leads are within the sensor housing, and the pair of terminals are within the connector housing.

8. The battery temperature sensor according to claim 1, wherein the sensor housing is formed with a connector fitting portion through which the pair of leads are led out; and
   wherein a locked portion, which locks to a lock claw of the second locking member, is formed on an inner surface of the connector fitting portion.

* * * * *